Patented Dec. 10, 1935

2,023,582

UNITED STATES PATENT OFFICE 2,023,582

HARD RUBBER COATING

Louis B. Haines, Baltimore, Md., assignor to Western Electric Company, Incorporated, New York, N. Y., a corporation of New York No Drawing. Application December 30, 1931, Serial No. 583,919

1 Claim. (Cl. 91—70)

This invention relates to hard rubber coatings and a method of applying the coatings.

Objects of the invention are to provide an insulating and protective coating on an article and an effective method of applying the coating.

In many instances it is desirable to apply a coating to metal parts for the purpose of electrically insulating the parts and also as a protection of the metal against corrosion in air or other media which have a tendency to attack the metal. Due to the irregular shape of many metal parts and also as a matter of expediency, it is most convenient to apply the coating by spraying the material on the parts or dipping the parts therein.

In one embodiment of the invention, a rubber solution is made by dissolving uncured rubber in a solvent having a low surface tension at room temperatures, such as benzine, and containing sufficient sulphur to produce a hard rubber finish when vulcanized.

In practicing the invention a solution of rubber is made having such a fluidity that it may readily be applied by spraying the rubber on the articles to be coated or dipping the articles in the solution. When a rubber solution is applied to a smooth metallic surface, there is a tendency for the solution to draw into beads or strings on account of the surface tension of the solvent. It has been found that by using solvents, such as benzine, naphtha, benzol, or trichlor-ethylene, which have a low surface tension at room temperatures, a thin coating of the solution on a metal surface will not bead or become stringy.

The uncured rubber is mixed with approximately 30 to 40 per cent of sulphur and suitable pigments, if any are used, in a roll mixing mill. This mixture is then dissolved in one of the solvents referred to above, sufficient solvent being used to form a rather thin solution. The solution is then applied to the article or articles to be coated and the coating is thoroughly dried. Due to the fact that only a thin coating is applied in this manner, it is usually necessary to apply a number of coatings to obtain the desired thickness of rubber coating. Each coating is thoroughly dried before the succeeding coat is applied. After the last coating is applied, the parts are placed in a jacketed steam heated vulcanizer and cured for a period of from four to seven hours at approximately 310° F. under an air pressure of 70 to 80 pounds per square inch.

In order to obtain a black bright finish, the following composition may be used:

| | |
|---|---|
| Smoked sheet rubber | 500 grams |
| Sulphur | 180 grams |
| Diphenylguanidine accelerator | 2½ grams |
| Mercaptobenzothiazole accelerator | 2½ grams |
| Benzine | 2500 c. c. |

Other colors may be obtained by adding suitable pigments to the compound. For instance, for a dull black finish 175 grams of Sierra talc and 25 grams of carbon black or benzol black may be added to the composition. For a bright red color, 375 grams of vermillion (English pale) or selenium oxide, 50 grams of arsenic sulphide, and 50 grams of lithopone may be added. A maroon colored coating may be had by adding 375 grams of vermillion (deep shade), 125 grams of lithopone and 25 grams of iron oxide to the composition.

For most purposes, a securely adhering coating is obtained by applying the coating directly to the metallic surface; however, it has been found that adhesion of the coating to the metallic surface may be improved by electrogalvanizing the surface before the coating is applied. The adhesiveness of the finished coating may also be increased by using a lead salt accelerator, such as the lead salt of dimethyldithiocarbamic acid on a clay base. Hard rubber finished coatings, as described above, have been applied to terminal strips, fanning rings for supporting cables in telephone switchboards, and foot rails with excellent results.

It will be understood that the nature and embodiment of the invention herein described is merely illustrative and that many changes and modifications may be made therein without departing from the spirit and scope of the invention. For example, other accelerators or combinations of accelerators may be used in place of the ones given in the example.

What is claimed is:

A method of applying a hard rubber coating to articles which comprises mixing substantially 500 parts of smoked sheet rubber, 180 parts of sulphur, 2½ parts of diphenylguanidine, and 2½ parts of mercaptobenzothiazole, dissolving the mixture in substantially 2500 parts of benzine, applying the solution to an article to form a coating and vulcanizing the coating.

LOUIS B. HAINES.